May 20, 1958 A. D. ISBELL 2,835,455
FISHING REEL
Filed Nov. 5, 1956
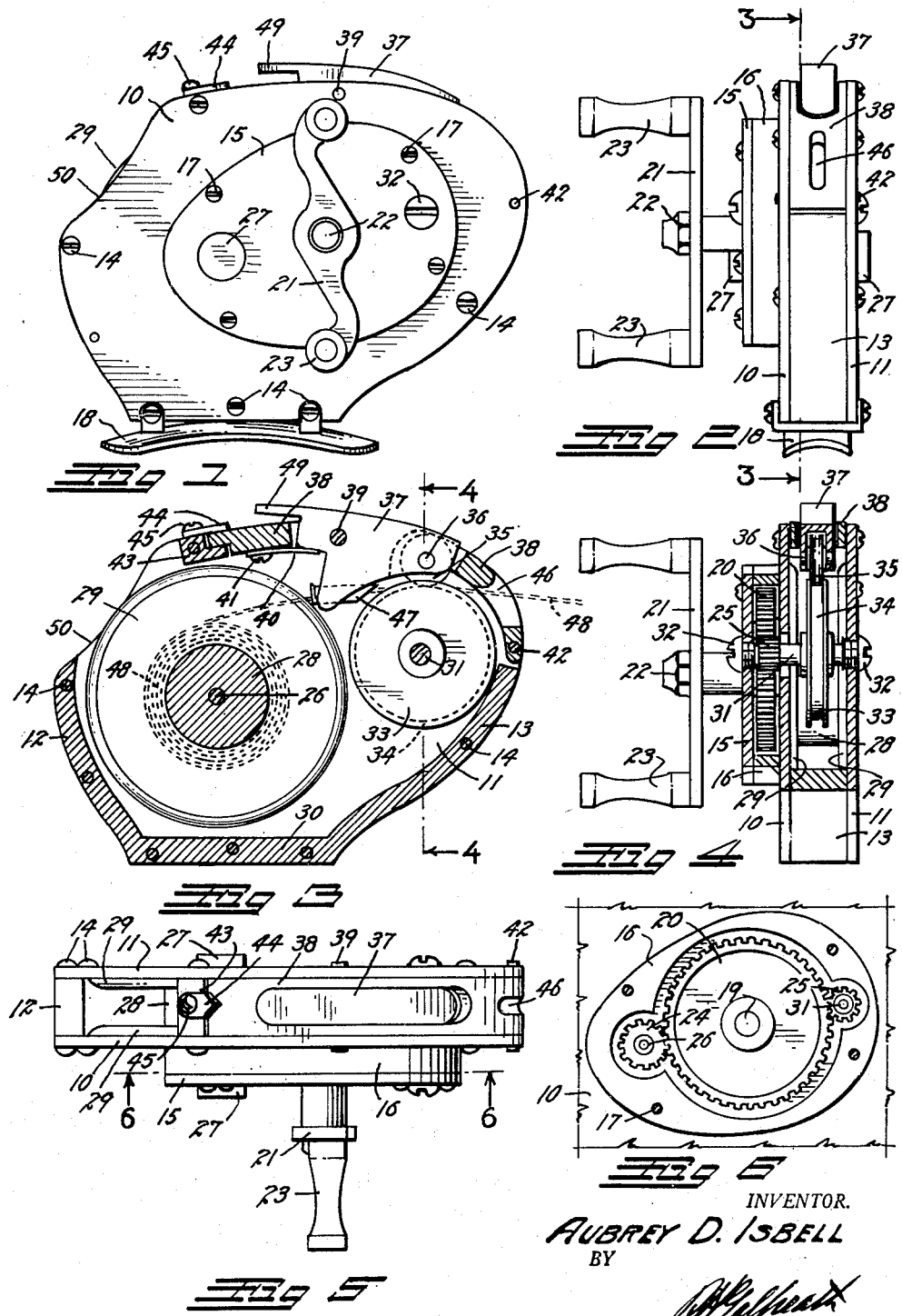
INVENTOR.
AUBREY D. ISBELL United States Patent Office 2,835,455
Patented May 20, 1958

2,835,455

FISHING REEL

Aubrey D. Isbell, Loveland, Colo.

Application November 5, 1956, Serial No. 620,228

2 Claims. (Cl. 242—84.1)

This invention relates to a fishing reel of the type illustrated and described in applicant's prior Patent No. 2,776,096 and has for its principal object the provision of a simple, easily used and highly efficient reel which will maintain the line properly tensioned on the rear spool at all times so as to prevent entanglement and irregular winding of the line on the spool.

Another object of the invention is to provide a relatively, small, light-weight and convenient spool type reel from which the line can be rapidly unreeled and retrieved on the reel spool without forming loops, tangles and knots in the line.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a right side view of the improved reel, illustrating the reel mounted on a reel foot for attachment to the reel seat of a conventional fishing rod;

Fig. 2 is a front view thereof;

Fig. 3 is a longitudinal, vertical section, taken on the line 3—3, Fig. 1, with the reel foot omitted;

Fig. 4 is a cross section, taken on the line 4—4, Fig. 1;

Fig. 5 is a top view of the improved reel; and

Fig. 6 is a detail section, taken on the line 6—6, Fig. 5.

The mechanism of the improved reel is contained between a right side plate 10 and a left side plate 11 of similar contour. The two side plates 10 and 11 are maintained in vertical spaced-relation by means of a rear spacing member 12, a front spacing member 13, and a bottom spacing member 30 which may be integrally formed and which are clamped between the plates 10 and 11 by means of suitable clamp screws 14. A gear cover plate 15 is spaced from the outer surface of the right frame plate 10 by means of a suitably contoured spacer member 16 and is secured in place on the side plate 10 by means of suitable attachment screws 17.

It is, of course, possible for the spacing members 12, 13, 30, and 16 to be cast or formed integrally with the plates. It has been found, however, that if the plates are formed from a non-corrosive metal and the spacing members are formed from plastic, a very satisfactory construction is obtained.

A conventional reel foot 18 may be attached to the bottom of the two plates 10 and 11 in any desired manner such as by means of the lowermost clamp screws 14. The reel foot is of suitable design to be received in any of the conventional reel seats with which fishing rods are provided.

A crank shaft 19 is journalled in the gear cover plate 15 and carries at its inner extremity, a relatively large drive gear 20. A conventional hand crank 21 is detachably mounted on the outer extremity of the crank shaft 19 in any desired manner, such as by means of a mounting nut 22. The crank 21 is provided with finger knobs 23 by means of which the drive gear 20 may be rotated. The drive gear 20 meshes with a spool pinion 24 and a disc pinion 25.

The spool pinion 24 is of relatively larger diameter than the disc pinion 25 and the spool pinion 24 is formed or carried on a spool shaft 26 which extends through the three plates 15, 10 and 11 and is journalled in removable journal caps 27 threaded into the plates 15 and 11. The spool shaft carries a line spool 28 provided with side flanges 29. The side flanges 29 are rolled or turned oppositely outward at their peripheral edges and these outwardly turned edges ride in indented grooves in the inside faces of the plates 10 and 11 to guide and hold a fishing line on the spool 28.

The disc pinion 25 is fixed upon a disc shaft 31 which extends through the plates 10 and 11 and is journalled at its extremities in hollow bearing screws 32 which are threaded through the plates 11 and 15. A traction disc 33 is fixed upon the disc shaft 31 intermediate the plates 10 and 11. The traction disc can be accurately aligned in its intermediate position by adjustment of the bearing screws 32. The traction disc 33 is provided with an indented medial, peripheral line groove 34 in which a pressure roller 35 travels.

The pressure roller 35 rotates upon a roller shaft 36 mounted in the forward extremity of a tilting roller block 37. The block 37 is positioned in a suitable elongated receiving opening in a hinged lid member 38 and is pivoted upon a pivot pin 39 extending transversally of the lid member 38. A leaf spring 40, mounted beneath the lid member 38 by means of a suitable spring screw 41, acts upwardly against the rear portion of the roller block 37 to urge the roller 35 downwardly into and against the bottom of the line groove 34 in the disc 33. The block 37 is provided with a rearwardly extending thumb tab 49 by means of which the rear extremity may be depressed against the reaction of the spring 40. The tab 49 will contact the top of the lid member 38 just before the roller 35 reaches the top of the groove 34 so that the lower edge of the roller will always remain between the sides of the groove.

The lid member 38 is hingedly mounted at its forward extremity upon a hinge pin 42 extending between the plates 10 and 11 and, when closed, rests upon a stop block 43, mounted between the plates 10 and 11 upon one of the clamp screws 14. The lid member 38 may be locked in the closed position by means of a latch member 44 mounted on a latch screw 45 and positioned to be turned over the rear extremity of the lid member 38. The lid member is provided at its forward extremity with a line guide slot 46 and the roller block 37 is provided with a line guide tube 47 of hardened wear-resistant material.

The fishing line indicated in broken line at 48 passes from the spool 28 through the tube 47 between the roller 35 and the bottom of the groove 34 in the disc 33 thence forwardly through the line guide slot 46 to the conventional line guides of the fishing rod.

Let us assume that it is desired to free the line for free casting purposes. The thumb tab 49 of the block 37 is depressed. This raises the pressure roller 35 from the line and allows the latter to freely flow from the reel and beneath the roller 35 and between the sides of the groove 34 in the disc 33. Let us now assume it is desired to retrieve the line, the thumb tab 49 is released so that the pressure roller 35 will grip the line against the bottom of the line groove 34. The crank 21 is then rotated clockwise to cause the drive gear 20 to rotate the spool pinion 24 and the spool 28 counter-clockwise, and the disc pinion 25 and the disc 33 counter-clockwise. Since the spool pinion 24 is of larger diameter than the disc pinion 25, the disc 33 will rotate rearwardly faster than the spool 28 and will frictionally engage the line to assist the spool in retrieving the line so as to reduce the tension in the line coil on the spool and prevent tight binding of the coil turns on the spool. As the diameter of the coil of line on the spool increases, the line will be simply pulled rearwardly beneath the roller 35 in frictional engagement with the disc 33 to maintain a smooth, uniformly tensioned line coil.

To unreel the line, the crank 21 is simply rotated as rapidly as desired in a counter-clockwise direction. This causes the more rapidly rotating disc 33 to frictionally pull the line from the spool and force it forwardly through the line slot 46. Thus maintaining a uniformly tensioned condition in the line within the confines of the reel at all times to prevent the formation of loops and entanglements.

Access can be easily and quickly had for line placement and replacement and threading by simply releasing the latch and swinging the lid member upwardly to the open position. When in the latter position, the pressure roller is withdrawn from the line groove 34 and the guide tube 47 is elevated for easy access.

The reel is open between the stop block 43 and the rear spacing member 12 and the side plates 10 and 11 opposite this opening are arcuately cut-back, as indicated at 50, to allow the thumb of the user to be pressed against the smooth peripheries of the side flanges 29 of the spool 28 to control the unreeling movement as desired.

While a specific form of the improvement has been described and illustrated herein, it is desired to be understood that the same may be varied within the scope of the appended claims without departing from the spirit of the invention.

Having thus described the invention, what is claimed and desired secured by Letters Patent is:

1. A fishing reel comprising: a front side plate; a rear side plate; spacer means maintaining said side plates in parallel spaced relation; a gear cover plate supported from said front side plate in parallel relation thereto; a spool shaft; a disc shaft, said latter two shafts extending between and being journalled in said rear side plate and said gear cover plate; a line spool mounted on said spool shaft between said front and rear side plates; a traction disc having a peripheral line groove mounted on said disc shaft between said front and rear side plates; a crank shaft journalled in said gear cover plate; a drive gear mounted on said crank shaft between said gear cover plate and said front side plates; a spool pinion mounted on said spool shaft; a disc pinion mounted on said disc shaft, said pinions being in mesh with said drive gear; a roller block tiltably mounted between said side plates adjacent said traction disc; a pressure roller journalled in said roller block and positioned to travel in said line groove to maintain the line therein; spring means acting against said block to urge said roller into said groove; a lid member hingedly mounted between said side plates, said roller block being mounted in said lid member so that when said lid member is swung open said pressure roller will be swung from said line groove; and latch means engageable with said lid member for maintaining the latter in the closed position.

2. A fishing reel as described in claim 1 having a line guide tube supported from said roller block between said spool and said traction disc and acting to guide the line from the former to the latter.

References Cited in the file of this patent

UNITED STATES PATENTS

| 402,688 | Schulz | May 7, 1889 |
| 412,629 | Kepler | Oct. 8, 1889 |
| 2,197,675 | Babcock | Apr. 16, 1940 |
| 2,553,589 | Hull et al. | May 22, 1951 |

FOREIGN PATENTS

| 884,710 | Germany | July 30, 1953 |